United States Patent
Nowack

(10) Patent No.: US 7,290,743 B2
(45) Date of Patent: Nov. 6, 2007

(54) DEVICE THAT ATTACHES TO A SURFACE

(76) Inventor: Clifford William Nowack, P.O. Box 290684, Phelan, CA (US) 92329

( * ) Notice: Subject to any disclaimer, the term of this patent is extended or adjusted under 35 U.S.C. 154(b) by 43 days.

(21) Appl. No.: 11/304,232

(22) Filed: Dec. 14, 2005

(65) Prior Publication Data

US 2007/0131831 A1   Jun. 14, 2007

(51) Int. Cl.
*F16B 15/06*    (2006.01)
*A47G 29/00*    (2006.01)

(52) U.S. Cl. .............. 248/216.1; 248/217.1; 248/489; 248/547; 411/439; 411/457

(58) Field of Classification Search ............ 248/216.1, 248/475.1, 489, 493, 694, 216.4, 217.1, 217.2, 248/217.3, 547; 411/457, 439, 458, 469, 411/922
See application file for complete search history.

(56) References Cited

U.S. PATENT DOCUMENTS

| | | | | |
|---|---|---|---|---|
| 2,288,439 A | * | 6/1942 | Dahm | 248/547 |
| 3,401,434 A | * | 9/1968 | Daddona, Jr. | 24/689 |
| 3,892,015 A | * | 7/1975 | Taylor | 24/588.12 |
| 4,040,149 A | * | 8/1977 | Einhorn | 248/493 |
| 4,094,490 A | * | 6/1978 | Einhorn | 248/489 |
| 4,795,294 A | * | 1/1989 | Takada et al. | 411/457 |
| 4,911,396 A | * | 3/1990 | Polonsky | 248/547 |
| 5,346,169 A | * | 9/1994 | Polonsky | 248/547 |
| 6,206,334 B1 | * | 3/2001 | Weck et al. | 248/467 |
| D461,397 S | | 8/2002 | Weck et al. | |
| D474,106 S | | 5/2003 | Weck et al. | |
| 6,758,455 B2 | * | 7/2004 | Weck et al. | 248/475.1 |
| 2003/0085331 A1 | | 5/2003 | Weck et al. | |
| 2004/0051022 A1 | | 3/2004 | Weck et al. | |

OTHER PUBLICATIONS http://www.simpullproducts.com/howtheywork.htm.
http://www.ooks.com/patent.cfm.

* cited by examiner

*Primary Examiner*—Anita M. King
(74) *Attorney, Agent, or Firm*—Joseph E. Mueth, Esq.

(57) ABSTRACT

A device that attaches to a surface.

A first element having a surface adapted to be carried flush with a surface of a constructed surface and having a plurality of splayed through openings therein.

A second element adapted to be moved or pressed toward and held by the first element and having a plurality of tines joined to the second element in proximity to one extremity of the tines.

The tines pass slidably through the splayed openings in the first element and have sharp penetrating ends which project into the constructed surface when the second element is moved toward first element and force is applied to the second element while the surface of the first element is flush with the constructed surface such that the first element comes affixed to the constructed surface by the tines.

8 Claims, 7 Drawing Sheets

DEVICE THAT ATTACHES TO A SURFACE

FIELD OF INVENTION

Background of the Invention

It is customary to drive load-bearing members such as nails, tacks, push pins, screws and the like into constructed surfaces to provide a fixed projection in order to attach or hang objects. For heavy loads, various types of bolts or brackets are often used.

Constructed surfaces are usually made of plaster on lath, wallboard, sheetrock, wood, or cork; the nails, tacks, pins, screws, bolts or brackets, when pressed, driven or screwed into the constructed surface create holes in the constructed surface itself as well as any painted coating, wallpaper, wall finishing, or texture on the constructed surface. The constructed surface itself can be easily chipped away around the hole becoming enlarged and unsightly, permanently damaging the constructed surface and any coating.

This is a matter of concern to the homeowner as well as to the tenant or lessee of an apartment, office or retail space since it becomes necessary to repair the constructed surface and repaint or replace the coating subsequently before moving or redecorating. Thus, the damage done by the load-bearing member can represent a major cost over time in as much as constructed surfaces typically contain many such load bearing members scattered over the home, apartment, etc.

Another problem associated with the use of the load bearing members is that they are often long enough to be driven entirely through the constructed surface itself, that is, through the plaster, wallboard, etc., into ducting, pipes, electrical wiring and studs which can result in costly damage, malfunctions and personal injury.

SUMMARY OF THE INVENTION

Briefly, the present invention is a device that attaches to a surface comprising:

a first element having a surface adapted to be carried flush with a constructed surface and having a plurality of splayed through openings therein;

a second element adapted to be moved or pressed toward and held by said first element and having a plurality of tines joined to said second element in proximity to one extremity of said tines;

said tines passing slidably through said splayed openings in said first element and having sharp penetrating ends which project into said surface when said second element is moved toward first element and force is applied to said second element while said surface of said first element is flush with said constructed surface such that said first element comes affixed to said constructed surface by said tines.

The combination of
(1) a constructed surface; and
(2) a device that attaches to said surface comprising;
a first element having a surface flush with said surface of said constructed surface and having a plurality of splayed through openings therein;
a second element held by said first element and having a plurality of tines joined to said second element in proximity to one extremity of said tines;
said tines passing slidably through said plurality of splayed openings in said first element and having sharp penetrating ends projecting into said constructed surface such that said first element is affixed to said constructed surface by said tines and said device is adapted to support objects hanging therefrom.

DESCRIPTION OF PREFERRED EMBODIMENT

Turning to the drawings.

Figure 1:
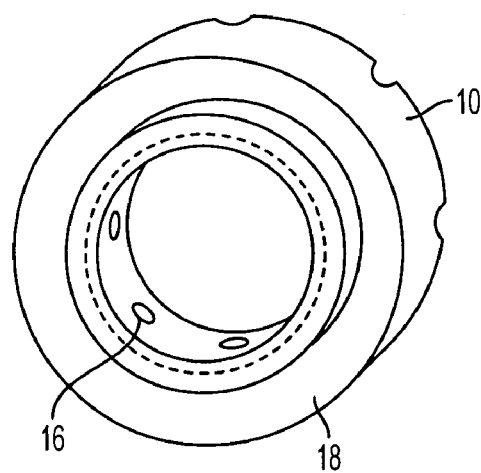
FIG. 1 is a perspective view of said first element.
Figure 2:
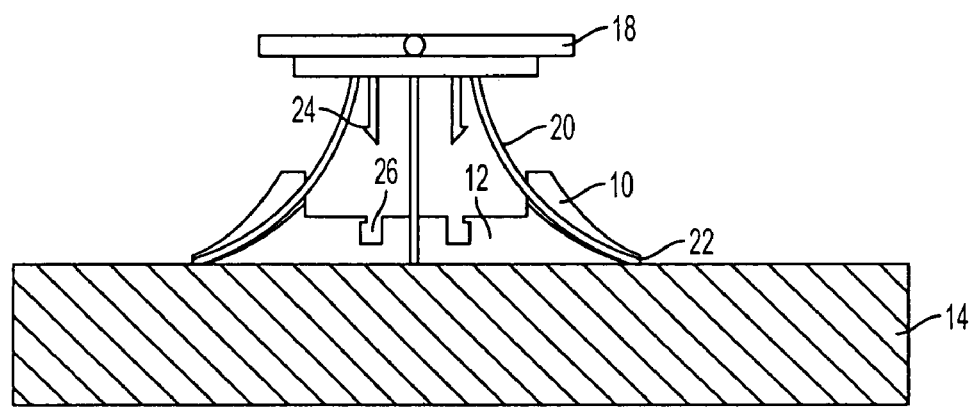
FIG. 2 is a side section view of the first and second element positioned such that one surface of the first element is flush with the constructed surface and the second element is ready to have force applied thereto to advance the plurality of tines in splayed fashion beyond the first element and into the constructed surface.
Figure 3:
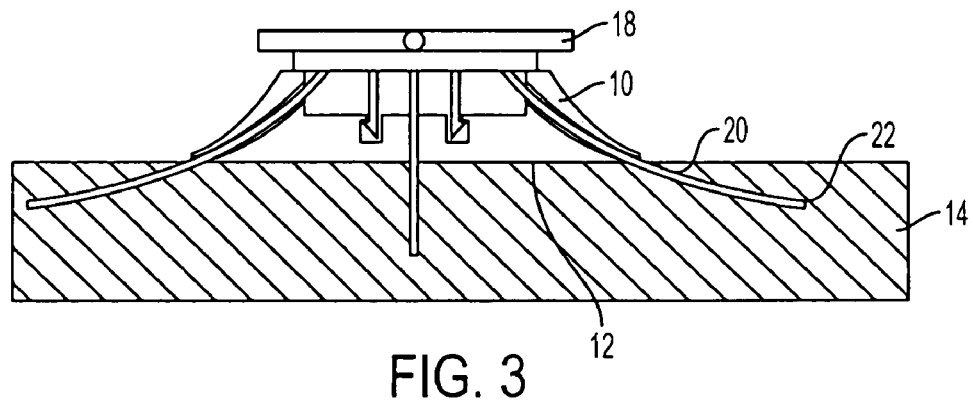
FIG. 3 shows the elements of FIG. 2 in section after the second element has been moved into proximity to the first element and the tines have been driven into the constructed surface.
Figure 4:
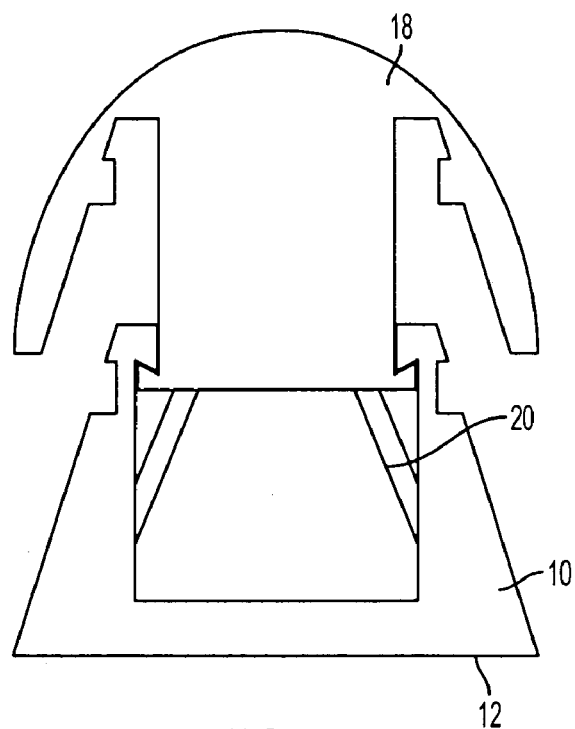
FIG. 4 is a side view of another embodiment of the invention, the second element of which has a domed outer surface, just prior to the movement of the second element toward the first element.
Figure 5:
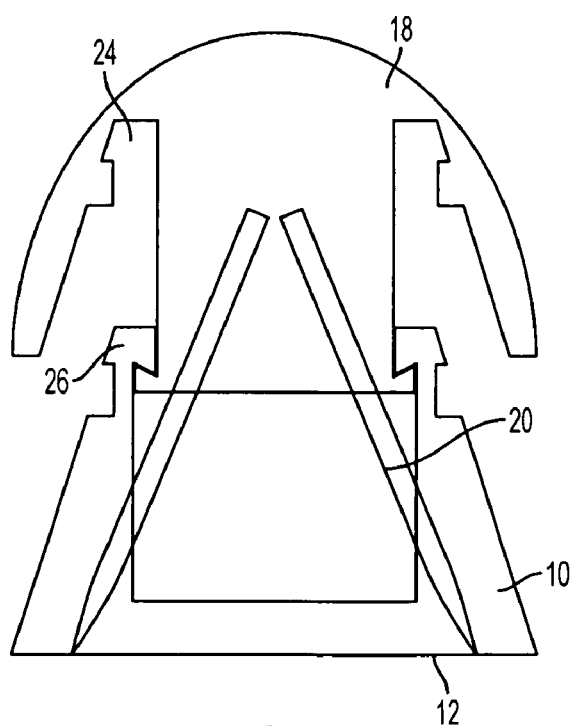
FIG. 5 is a side sectional view of the embodiment of FIG. 4.
Figure 6:
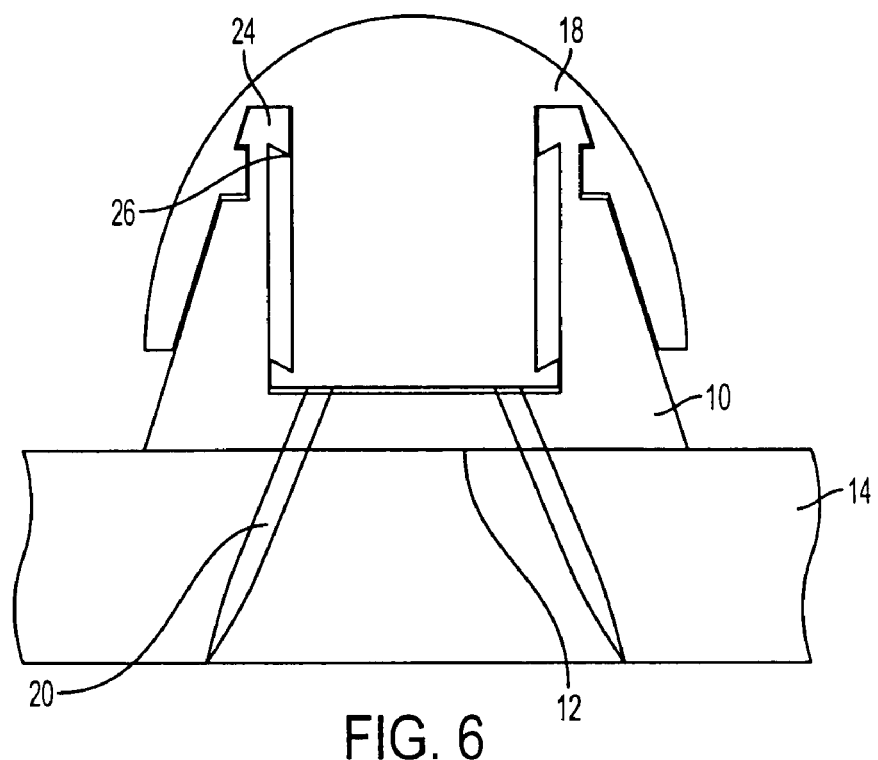
FIG. 6 is a side view of the device of FIGS. 4 and 5 after the second element has been moved or pressed toward said first element and the tines driven into a constructed surface.
Figure 7:
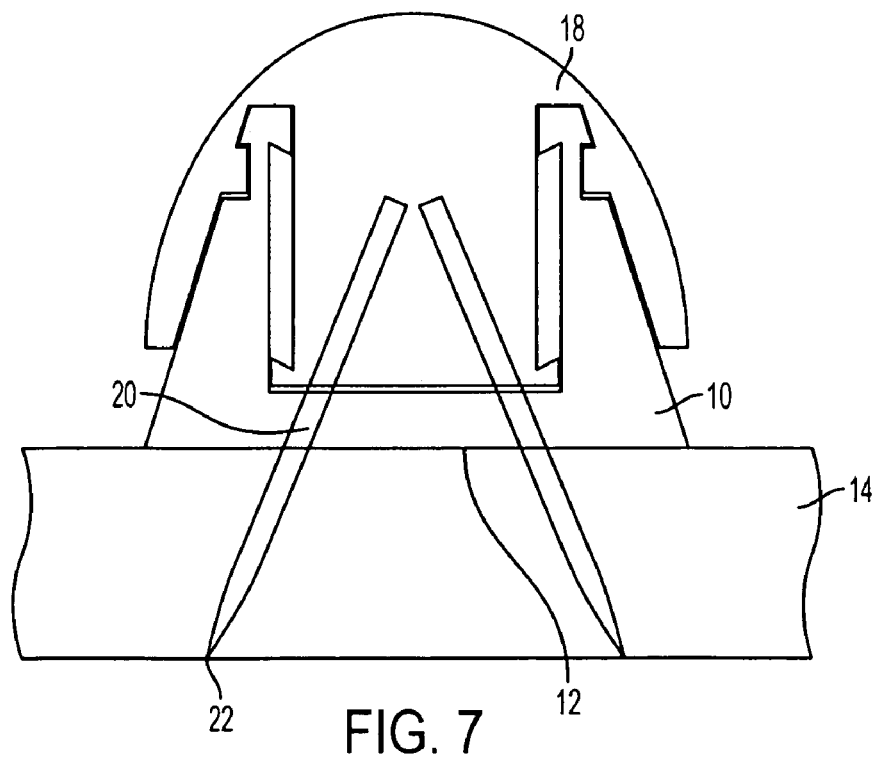
FIG. 7 is a sectional view of the device of FIG. 6.
Figure 8A:
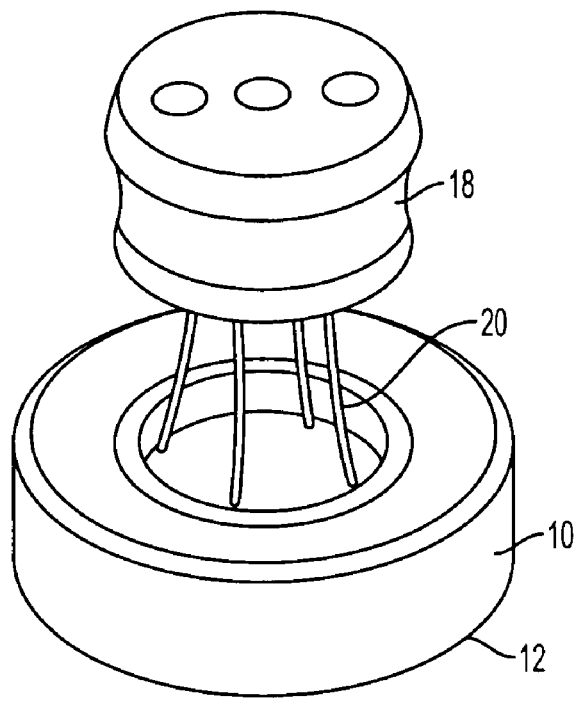
FIG. 8A is a perspective view on an alternate embodiment of this invention.
Figure 8B:
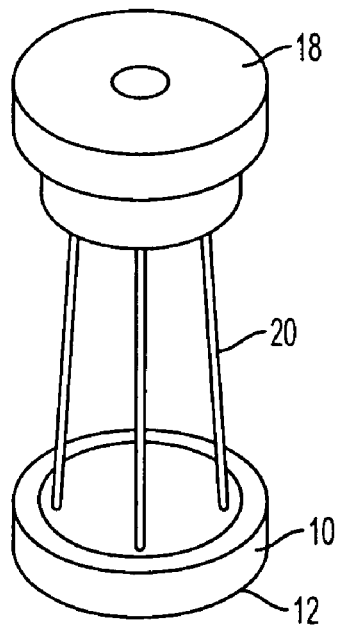
FIG. 8B is a perspective view of another alternate embodiment of this invention.
Figure 8C:
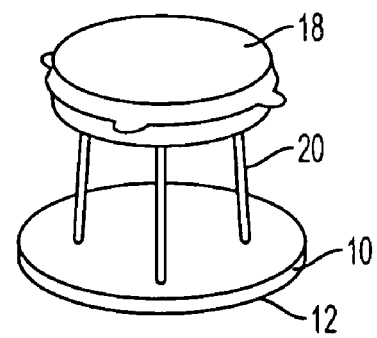
FIG. 8C is an alternate view of still another embodiment of this invention.
Figure 9:
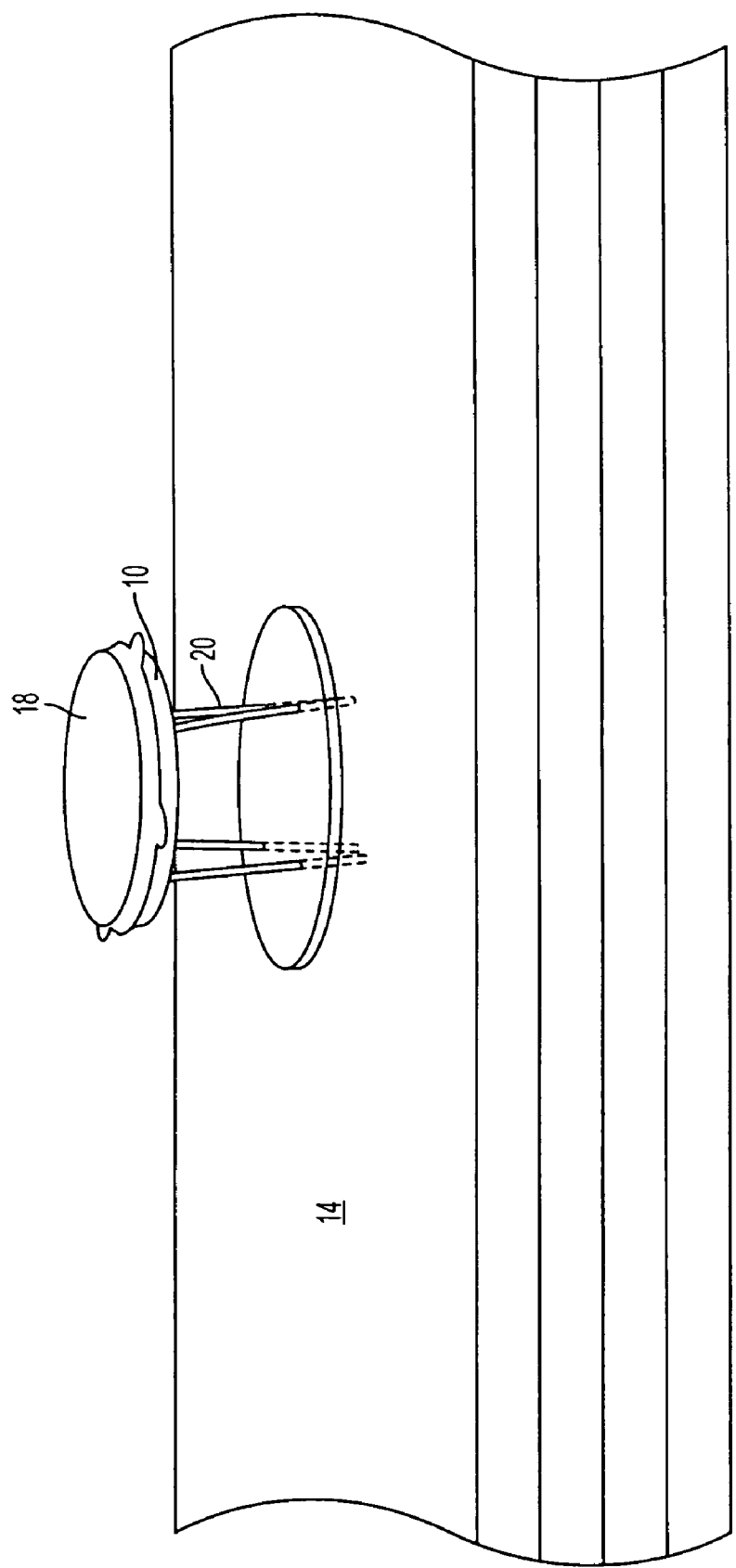
FIG. 9 shows a side perspective view of the device of FIG. 8C as the tines have been partially driven into a constructed surface.
Figure 10:
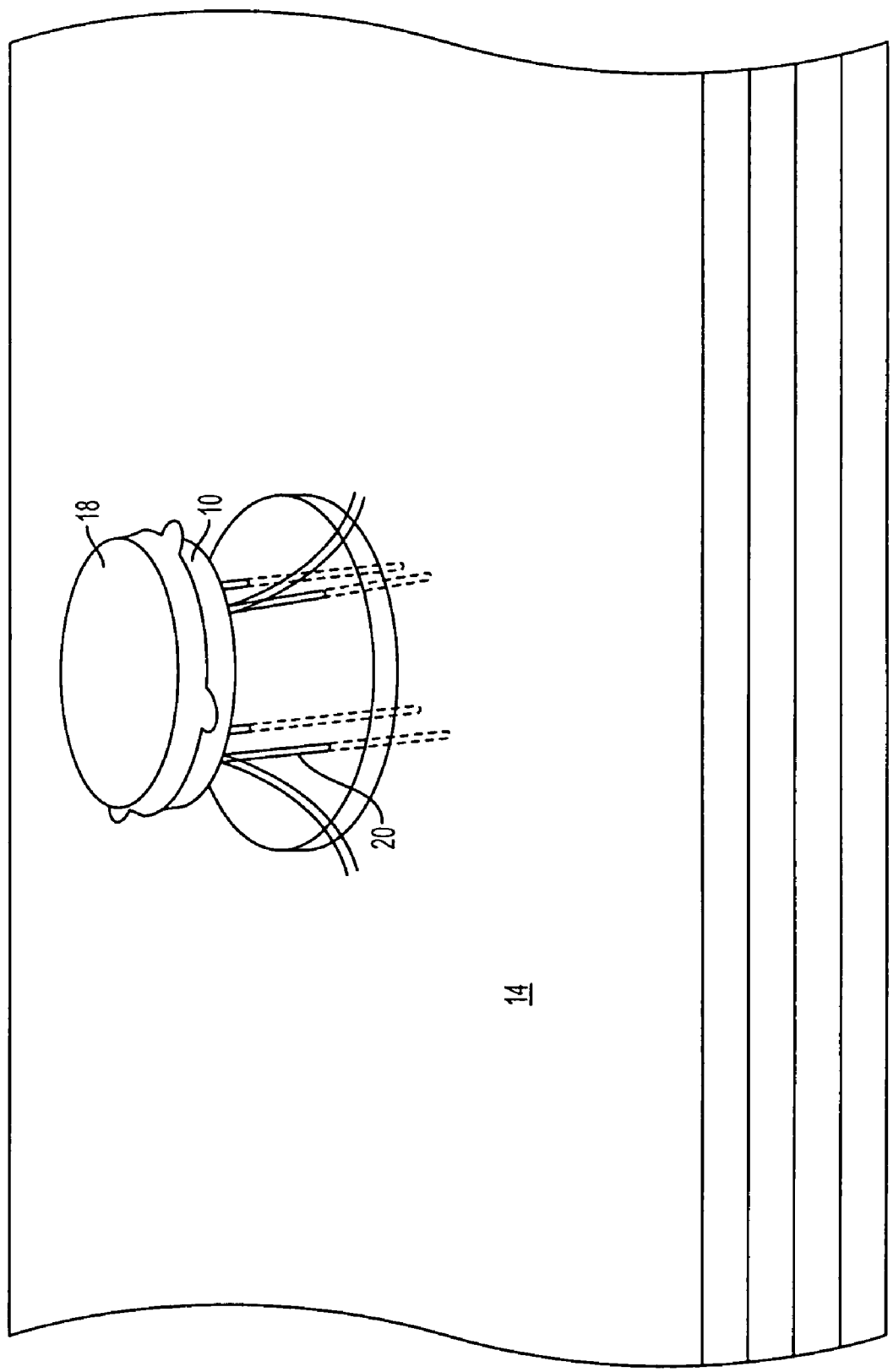
FIG. 10 shows the device of FIGS. 8C and 9 as it has been further driven or advanced into a constructed surface.
Figure 11:
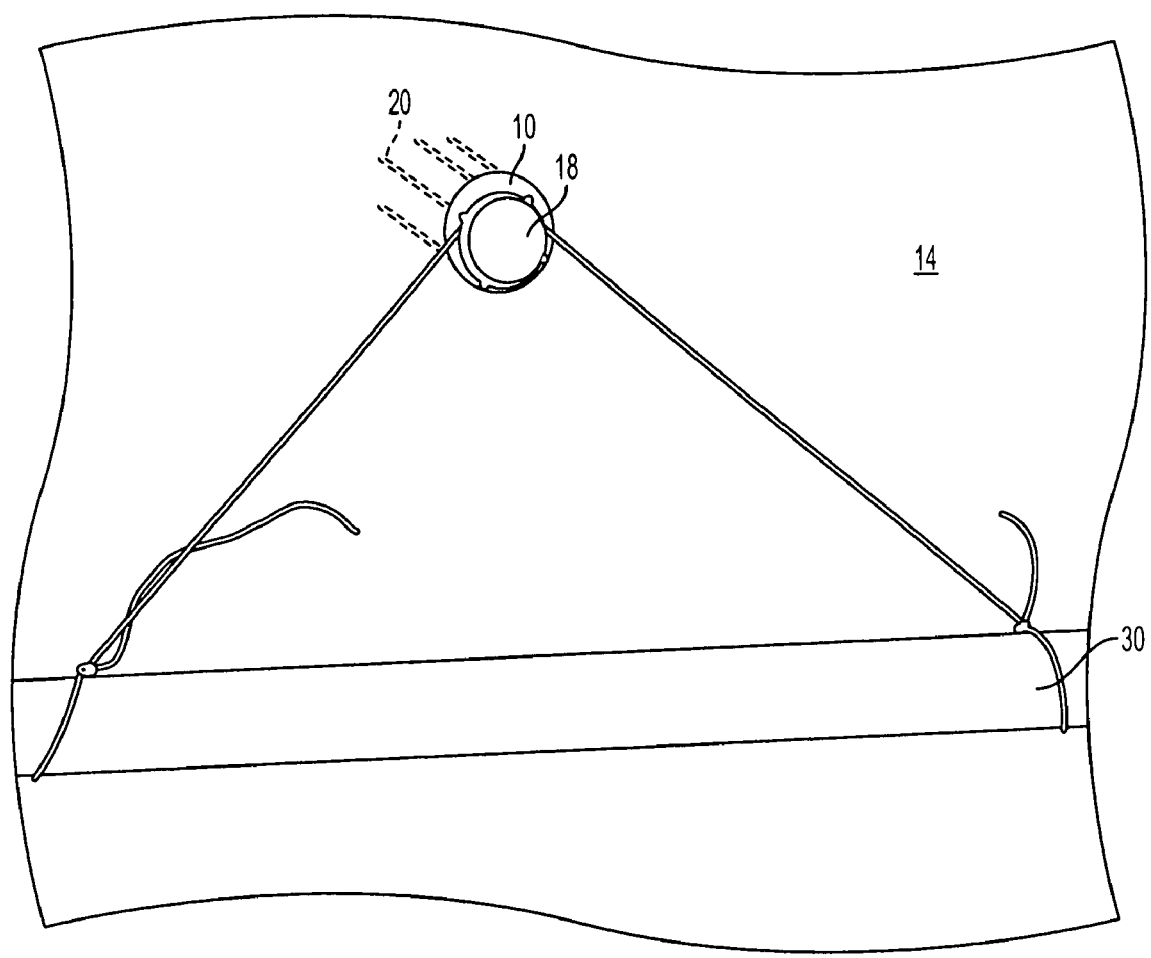
FIG. 11 shows the device of FIGS. 8C, 9 and 10 with the tines fully driven or advanced in a constructed surface and with an attached object in place.

The device of this invention can be pressed up against a wall that has been constructed with gypsum board drywall. As the user pressed harder or twists, the sharp needle-like tines protrude from the side of the device that is against the wall and intrude into the dry wall. The opposing directions of the needle-like protrusions cause them to act against each other and hold fast into the wall.

Turning to the drawings in more detail, the first element 10 has a surface 12 adapted to be flush with a surface of a constructed surface 14. The surface 12 is usually flat. However, if the constructed surface is curved, surface 12 can be correspondingly curved to abut the constructed surface.

The first element 10 can be made of any solid material as wood, metal or plastic. The first element 10 has a plurality of splayed openings 16 running there through. The splayed openings 16 run through element 10 at a generally acute angle to surface 12.

The second element 18 has a plurality of tines 20 complementary in number to, and arrayed to be in alignment with, openings 16. One end or extremity of tines 20 is securely joined to second element 18.

The tines 20 pass slidably through the splayed openings 16 of first element 10. The tines can be made of metal, plastic or other suitable material and have sharp, penetrating ends 22 adapted to pierce or intrude into constructed surface 14 as is further described below.

In the arrangement of first and second elements 10 and 18 as disposed prior to installation on a constructed surface, the tines 20 in openings 16 do not protrude beyond surface 12, that is, the sharp penetrating ends 22 are not exposed so that the device can be safely and easily handled without risk of one's fingers being cut or punctured by ends 22.

At installation, the first element 10 is held against the constructed surface 14 with surface 12 abutting the constructed surface 14. Force is applied to the outside of second element 18 by hand or hammer which moves the second element 18 toward the first element 10 and advances the tines 20 in openings 16 such that the penetrating ends 22 emerge from surface 12 and penetrate the constructed surface 14 and intrude into the surface coating and constructed surface in a splayed arrangement to secure the device to the constructed surface 14.

The tines 20 when engaged in constructed surface 10 in the splayed arrangement provide a firm attachment capable of great load bearing. At the same time the tines 20 can be quite fine such that they pierce the surface coating and constructed surface without doing significant damage or creating large, ugly holes and chips. Thus, subsequent repair and patching costs are reduced.

Due to the splayed arrangement of the tines 20, the engagement of the device is more secure than is provided by a typical nail or screw.

The tines 20 are normally at least three, but can be four, five, six, seven, eight or more. The tines 20 are fine needle-like elements which can be metal, plastic or any other sturdy material.

Preferably, elements 10 and 18 have interlocking elements 24 and 26 which keep elements 10 and 18 together once the device has been installed on a constructed surface. The device projects from the constructed surface which provides an attachment point from which object 30 is hung.

The interlocking elements such as a clip or stop prevent the top or second element 18 of the device from moving once the device is in place. However when the user wishes to remove the device, the clip or stop can be disengaged so that the tines 20 will retreat back into the device leaving very small and easily repaired holes in the constructed surface.

The invention claimed is:

1. A device that attaches to a constructed surface comprising:
   a first element having a first surface adapted to be carried flush with said constructed surface, a second surface, and having a plurality of splayed through openings running in an increasingly divergent array from said second surface to said first surface;
   a second element adapted to be moved or pressed toward and held by said first element and having a plurality of tines joined to said second element in proximity to one extremity of said tines;
   said tines passing slidably through said splayed openings in said first element and having sharp penetrating ends which project into said constructed surface when said second element is moved toward said first element and force is applied to said second element while said surface element is flush with said constructed surface such that said first element comes affixed to said constructed surface by said tines.

2. The device of claim 1 wherein when said first element is affixed to said constructed surface by said tines, and said first and second elements are held together by interlocking elements.

3. The device of claim 1 wherein when said device is affixed to said constructed surface, the device provides a projection extending outwardly from the constructed surface to provide an attachment point from which any desired object can be attached or hung.

4. The combination comprising:
   (a) a constructed surface; and
   (b) a device that attaches to said constructed surface comprising;
   a first element having a surface flush with said constructed surface and having a plurality of splayed through openings running in an increasingly divergent array from said second to said first surface;
   a second element held by said first element and having a plurality of tines joined to said second element in proximity to one extremity of said tines;
   said tines passing slidably through said plurality of splayed openings in said first element and having sharp penetrating ends projacting into said constructed surface such that said first element is affixed to said constructed surface by said tines and said device is adapted to support objects hanging therefrom.

5. The combination of claim 4 wherein when said first element is affixed to said constructed surface by said tines and said first and second element are held together by interlocking elements.

6. The combination of claim 4 wherein when said device is affixed to said constructed surface, the device provides a projection extending outwardly from the constructed surface to provide an attachment point from which any desired object can be attached or hung.

7. The combination of claim 4 wherein when said first and second elements have interlocking elements which keep said first and second elements together once the device has been installed on a constructed surface.

8. The combination of claim 4 wherein there are at least three tines.

* * * * *